United States Patent [19]

Becker et al.

[11] 3,860,650

[45] Jan. 14, 1975

[54] PROCESS FOR THE PRODUCTION OF ORGANIC AMINES

[75] Inventors: Mitchell Becker, Teaneck; Sargis Khoobiar, Clifton, both of N.J.

[73] Assignee: Halcon International, Inc.

[22] Filed: May 27, 1969

[21] Appl. No.: 828,333

[52] U.S. Cl............. 260/570 D, 252/416, 252/453, 260/290, 260/571, 260/575
[51] Int. Cl............................................. C07c 85/02
[58] Field of Search................ 260/570 D, 581, 575

[56] References Cited
UNITED STATES PATENTS 1,935,209  11/1933  Herold et al....................... 260/581
1,992,935  3/1935   Arnold........................... 260/584 X
2,013,873  9/1935   Vogt................................ 260/581
3,231,616  1/1966   Jones.............................. 260/581
3,272,865  9/1966   Barker............................ 260/581
3,384,667  5/1968   Hamilton....................... 260/581 X Primary Examiner—Robert V. Hines
Attorney, Agent, or Firm—William C. Long; David Dick; Riggs T. Steward

[57] ABSTRACT

A process and catalyst for the production of organic amines by amination of phenolic type compounds are shown. The catalyst consists essentially of alumina derived from a precipitated gel form and contains less than 1.0 weight percent of alkali metal.

9 Claims, No Drawings

PROCESS FOR THE PRODUCTION OF ORGANIC AMINES

This invention relates to catalysts for preparing organic amines from organic alcohols and ammonia. More particularly, it relates to catalysts consisting essentially of alumina for the liquid or vapor phase amination of certain phenolic type compounds, and specifically, it relates to the preparation of aniline over an alumina prepared from a precipitated alumina gel.

Processes for the production of aniline type compounds by the liquid or the vapor phase amination of phenolic compounds with ammonia, have been described in the patent literature. Generally, the reaction takes place at elevated pressures and temperatures between 300° and 600°C. in the presence of catalysts containing silica and alumina. An aniline reaction process is shown, for example, in U.S. Pat. No. 3,272,365, wherein phenol and ammonia are combined over silica-alumina catalysts at temperatures between 400° and 480°C.

Catalysts for commercial production of organic amines must have certain minimum performance characteristics. Catalyst activity, often expressed in terms of raw material conversion under certain process conditions is of primary concern. The more active a catalyst, the smaller the reaction space required for a given production or the lower the reaction temperature or flow rate required for that production. In aniline manufacture by the vapor phase amination of phenol with ammonia, it is of particular importance to provide a catalyst which is active at relatively low temperatures. At temperatures above 420° to 450°C., undesirable by-products are formed which may reduce the catalyst activity and life. However, more seriously from a commercial viewpoint, ammonia dissociates forming nascent nitrogen. In addition to the serious economic penalty due to reduction in yield, the nascent nitrogen causes case hardening and metal embrittlement in the reactor and associated equipment and piping. The nascent nitrogen, in combination with the otherwise corrosive reaction mixture, at high temperatures, requires the use of expensive materials of construction. It is uneconomical, however, to operate at lower reaction temperatures which result in lower conversions of raw material for the reason that the separation of product aniline from phenol is greatly complicated. Aniline and phenol form an azeotrope at 58 percent by weight aniline and 42 percent phenol. If the reaction effluent, after condensation contains less than this amount of aniline, an overhead product from a subsequent distillation step will produce the azeotrope. Economic production of pure aniline from this mixture is not possible.

A second performance characteristic of importance is the selectivity at which the amination reaction takes place, i.e., the ratio of desired product produced to total raw material converted. A selective catalyst produces high yield on raw materials and simplifies product separation and purification problems by essentially eliminating waste and by-product formation. In the aniline reaction, non-selective catalysts produce such by-products as α-picoline and high boilers which render the catalyst surface inactive by filling the pores thereof and increasing the tendency for carbon deposits to form. This necessitates more frequent catalyst regeneration with attendant expense and loss in production time, and, in addition, usually results in a loss of catalytic activity. Furthermore, these by-products, particularly α-picoline, are difficult to separate from the product aniline.

A third and important performance characteristic is the catalyst life and its ability to be regenerated. Most catalysts decline in activity during use and must be regenerated by oxidation with air to remove carbonaceous deposits which have formed. The time before regeneration, referred to as cycle time, and the degree to which a catalyst's activity is restored after regeneration are important considerations in the economic design of a commercial plant.

Several catalysts have been used heretofore with partial success. Those containing a small proportion of alumina, less than 25 percent by weight of total silica and alumina, have demonstrated the highest initial activity. These catalysts also have a satisfactory cycle time, their activity declining relatively slowly with time, but regeneration by present oxidation techniques is not completely satisfactory. It is postulated that a permanent and irreversible change in surface structure occurs during the amination reaction, particularly at higher reaction temperatures.

It was found that catalysts containing more alumina, 35 percent to 55 percent alumina, can be regenerated, and this discovery was made the subject of copending patent application Ser. No. 794,789, filed Jan. 28, 1969, and now abandoned. Their initial activity is somewhat lower than those containing less alumina but they can be regenerated to their initial activity. These catalysts necessitate operation at relatively higher reaction temperatures in order to maintain minimum conversion levels thereby increasing the danger of corrosion and decreasing yield.

A third catalyst consisting of alumina was discussed in Brennstoff-Chemie, Vol. 15, Issue No. 6, Mar. 15, 1934. The life of the catalyst was relatively short. Activity dropped off markedly after only 40 hours of service and higher temperatures accelerated the deactivation.

It is thus the primary object of this invention to provide a catalyst for amination of organic alcohols in either the liquid or the vapor phase, which has high activity at relatively low temperatures and which is selective to said amination.

It is a further primary object of this invention to provide a catalyst which has a long cycle time, which can be regenerated by conventional techniques and which will operate at or near initial activity levels after repeated regeneration.

It is a further and related object of the invention to provide a process for manufacturing such a catalyst.

It is a particular object of this invention to provide an active, selective, long-lived and regenerable catalyst for the production of aniline by reaction of ammonia and phenol.

It has now been found that these and other objects of this invention are achieved with a catalyst consisting essentially of alumina derived from precipitated gel forms, having a surface area of at least 150 square meters per gram and having an alkali metal content, expressed as alkali metal oxide, of not more than 1.0 percent by weight.

This discovery is surprising in view of earlier results obtained with alumina catalysts. It was to be expected that alumina-rich catalysts would have an initial activity somewhat lower than that of catalysts containing equal amounts of silica and alumina and substantially lower than catalysts of high silica and low alumina content. And it was to be expected that these catalysts would have a relatively shorter cycle time than those containing less alumina and would lose their activity through repeated regenerations. Still further, the nongel aluminas have consistently demonstrated less favorable performance characteristics than are obtained with the precipitated gels of this invention.

The improved process results obtained with the catalyst of this invention are set forth in the following detailed process description and in the Examples and Comparative Examples provided to contrast the superior performance of the catalysts disclosed.

DETAILED DESCRIPTION

A. Amination of Organic Alcohols

Processes for the catalytic amination of an organic alcohol are known. In the vapor phase process, a mixture of ammonia and alcohol vapor are typically passed into an externally heated tubular reactor containing a pelletized catalyst. The gases leaving the reactor are cooled to condense the amine product and unreacted alcohol and these are separated by distillation or crystallization.

The starting material may be any mono or poly hydroxy aromatic compound and, more particularly, a compound of the formula:

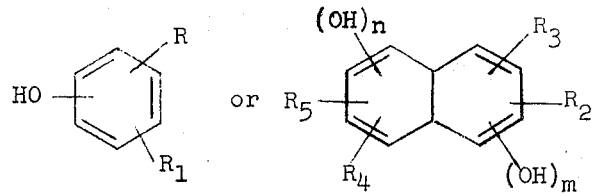

wherein the hydroxy and R and $R_1$-$R_5$ substituents may be on any of the positions of the phenyl or naphthyl moiety.

$n$ and $m$ may be a number from zero to two, only one of said $n$ and $m$ being zero in any one compound. R and $R_1$ to $R_5$ may be hydrogen, hydroxy, lower alkyl of 1 to 6 carbon atoms such as methyl, ethyl, isopropyl and the like, lower alkoxy wherein the alkyl moiety is the same as above, phenyl, phenyl lower alkyl wherein the lower alkyl moiety may contain from one to six carbon atoms such as methyl, propyl, isobutyl and the like, and a substituted phenyl lower alkyl of the formula:

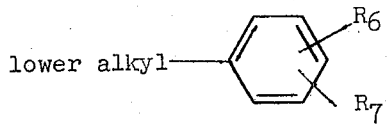

wherein $R_6$ and $R_7$ may be hydrogen, hydroxy, lower alkoxy (as above), lower alkyl (as above), only one of said $R_6$ and $R_7$ being hydrogen in any one compound. R may also be a substituted phenyl containing substituents $R_6$ and $R_7$ as above.

Suitably R and $R_1$ are hydrogen, lower alkyl, phenyl, hydroxyphenyl, phenyl lower alkyl or hydroxyphenyl lower alkyl, no more than one of R and $R_1$ being other than hydrogen, $R_2$-$R_5$ are hydrogen or lower alkyl, only one of $n$ and $m$ is other than zero, no more than one of $R_2$ and $R_3$ and no more than one of $R_4$ and $R_5$ being other than hydrogen.

Representative compounds for amination over the catalysts of this invention are phenol, naphthol, lower alkyl naphthol, dihydroxybenzene, lower alkyl phenol, dihydroxydiphenyl, and bis(hydroxyphenyl)lower alkyl. Preferred compounds are phenol, 4,4' dihydroxydiphenyl, ortho meta and para cresol, catechol, resorcinol, hydroquinone, bis (4 hydroxyphenyl) methane, 2,2 bis(4 hydroxyphenyl) propane and $\alpha$ or $\beta$ naphthol.

The molar ratio of ammonia to alcohol entering the vapor phase reactor may vary between 3:1 and 100:1 but preferably is between 5:1 and 25:1. The initial temperature of the reaction, i.e., the temperature required to activate the catalyst sufficiently to achieve the desired conversion, is usually between 300° and 570°C. although lower starting temperatures, for example the minimum temperature required to maintain a vapor phase under the pressure of the system, are possible. Preferably, the initial reaction temperature is between 350° and 400°C.

After the catalyst has aged, and the reaction temperature has been increased to maintain catalyst activity, the reaction is discontinued. The temperature at which reaction is discontinued is a maximum of 570°C. and preferably is between 400° and 425°C. Reaction pressure is suitably 15 p.s.i.g. to 1,000 p.s.i.g., and preferably is 125 p.s.i.g. to 400 p.s.i.g.

The catalyst is regenerated to remove carbonaceous material. This is typically accomplished by passing oxygen or preferably an oxygen-containing inert gas over the catalyst bed at a temperature at or above the kindling temperature of the carbonaceous matter. The combustion is controlled so that the surface temperature of the catalyst is below about 600°C. and the surface is not damaged. Rate of burning and thus surface temperature is controlled by adjusting the oxygen content of the oxygen-containing gas and the initial regeneration temperature.

Adsorbed organic material is displaced from the catalyst surface with an inert gas such as nitrogen at a space velocity of from 5 to 5,000 $hr^{-1}$ and preferably from 300 to 1,000 $hr^{-1}$. The temperature is then reduced to about 450°C. and 2 to 5 percent oxygen is passed over the catalyst at about 300 to 1,000 $hr^{-1}$.

The temperature is then slowly increased to about 470° to 550°C., preferably 490° to 510°C., at a rate which maintains about 2 to 3 percent oxygen in the outlet gas. The temperature is then reduced to approximately the initial regeneration temperature, and the oxygen level in the feed is increased to 5 to 10 percent at a rate which maintains the oxygen level in the effluent gas at about 2 to 8 percent. Finally, the reactor is cooled to about 450°C. and air is introduced while the temperature is simultaneously raised to between 490° and 510°C. at a rate which maintains at least some oxygen in the effluent gas. The catalyst is then ready for use in the amination reaction. Regeneration can be carried out at atmospheric or superatmospheric pressures. If the regeneration is carried out before the amount of adsorbed carbon on the catalyst is too high, preferably below one percent by weight, air can be introduced to the catalyst initially and the temperature can be raised to 510°C. so as to maintain some oxygen in the vent gas.

B. The Catalyst

The catalyst of this invention consists essentially of alumina prepared from a precipitated gel form. By "consisting essentially of" is meant a catalyst containing, on a water free basis, at least 90 percent by weight of alumina, and preferably at least 95 percent by weight of alumina, the other components being silica, titania, thoria or other materials which do not adversely affect the amination reaction or catalyst life. It is critical, that the catalyst contain not more than 1.0 percent by weight of alkali metal, expressed as alkali metal oxide.

The catalyst may contain other metal cations such as iron, or alkaline earth cations such as magnesium and calcium. Iron catalyzes the formation of by-products and should therefore comprise less than five percent and preferably less than one percent of the catalyst. The catalyst may also contain inert materials such as water and other solid diluents.

The alumina must be derived from a precipitated gel form. The name "gel" is applied to preparations of alumina which are amorphous, or mainly amorphous, and are hydrated forms obtained from solutions of aluminum salts or of alkaline aluminates. According to the conditions under which they are precipitated, they may differ widely in content of water of hydration, texture, and specific surface area. Those gels which are suitable for the process described generally must be precipitated at a pH above 7. The precipitated and dried gel can generally vary in water of hydration from $Al_2O_3 \cdot 3H_2O$ to $Al_2O_3 \cdot H_2O$.

An example of a preferred form of gel is one precipitated at a pH of about 9 and consisting mainly of an amorphous phase of aluminum hydrate having a water content somewhat higher than alumina monohydrate. This form is also known as gel-type boehmite. The gel can also contain colloidal boehmite. These two phases often coexist. Some crystallized trihydrates may also appear as additional constituents. This gel, after preparation, has a composition close to $Al_2O_3/1.5-2H_2O$. The crystalline arrangement has a relationship to that corresponding to the crystallized α-monohydrate but the crystallites are considerably modified and distorted; their size is of the order of $50_A$ and their water content is somewhat higher than in the usual monohydrate. An X-ray pattern, consisting of diffuse bands, expresses these characteristics and especially that the spacing which corresponds to the thickness of the structural layers is increased by the excess water which has become fixed between them. A typical method of precipitating the preferred gel is shown in the following procedure.

An aqueous solution of sodium aluminate is used as the starting material. The pH is adjusted to about 9 to 10 by the slow addition of a sodium carbonate solution. The resultant precipitate is filtered, extruded to a pellet form, and dried in a stream of hot air at about 110°–150°C. for several hours. It is then heated at about 20°C./hour to 500°C. Water of hydration is lost during this heating and the gel is converted predominantly to the "transition aluminas," as defined by ALCOA nomenclature, referring to eta, gamma and chi forms. The dried gel has a surface area of about 200–400 m²/g, mainly in pores of 25–100A in diameter. Additional prolonged heating at 500°C. produces no change in structure but generally slightly increases the surface area. Many other techniques for precipitating gels of the desired form are known to those skilled in the art. The foregoing procedure is meant to serve only as a guide. Gels of the type described above are commercially available, for example, from Alumina Corporation of America, described as H151 or Girdler Corp., described as T1732. The final activated catalyst should have a specific area of at least 150 square meters per gram.

To prepare the catalyst of this invention from a dried gel such as is described above having an alkali metal content in excess of 1.0 percent by weight expressed as alkali metal oxide, the dried gel is leached with an acid of organic or inorganic base, an acid salt or water until the alkali metal content is reduced below that figure. Preferably, the gel is intimately contacted with an acid by immersion in an aqueous solution thereof. Most desirably, the catalyst is heated in the acid. The dried gel may first be steamed to saturate its pores with water prior to immersion in the acid solution.

Acids which can be used to advantage in preparing catalysts are boric acid, phosphoric acid, hydrochloric acid, oxalic acid, citric acid, sulfuric acid and acetic acid. The time and temperature of contact should be sufficient to reduce the alkali metal content below the level given above. The acid treatment can be followed by a water wash though this is not a requirement for the successful performance of the catalyst. Aqueous solutions of salts of strong acids and weak bases can also be used successfully. Useful salts of this type are ammonium chloride, and titanium chloride.

The following examples are provided to further demonstrate the performance of the catalyst of this invention.

In the Examples, the following equipment and procedures were uniformly adopted for reacting phenol and ammonia to form aniline and for regenerating used catalyst.

1. Equipment and Process Steps
   a. Feed System
   A high pressure cylinder containing ammonia and equipped with a dip tube is placed in a constant temperature bath at 42°C. The cylinder pressure at these conditions is about 475 p.s.i.g. Liquid ammonia is removed from the cylinder, passes through a chiller, through a metering rotameter, and through a preheat vaporizer where the temperature is increased to about 225°C. This ammonia stream is mixed with phenol vapor prior to entering the reactor. Phenol is pumped, using a positive displacement pump, through a preheat vaporizer where the temperature of the phenol is raised above its dew point (about 320°C.) at reaction pressure.
   b. Reactor System
   The reactor consists of a 120 inch × 1 inch × 14 B.W.G. carbon steel tube. The tube is heated externally be means of a circulating, high-temperature, molten-salt bath.
   c. Collection System
   The gases leaving the reactor are cooled to 70°C. to condense essentially all the aniline and unreacted phenol. The off gases are removed from the system and analyzed for residual products by means of gas chromatography and the condensed product is also analyzed.
2. Reaction Procedure
   Regeneration Procedure
   The following steps were practiced for catalyst regeneration.
   1. Discontinue phenol feed.

2. Reduce reactor pressure to atmospheric conditions.

3. Displace adsorbed organics with nitrogen gas at a space velocity of 300 hr$^{-1}$.

4. Reduce temperature to 400°C. and pass 2 percent oxygen over the catalyst at about 1,000 hr$^{-1}$ gas space velocity. Slowly increase the temperature to 500°C. at a rate which maintains oxygen in the outlet gas stream at about 1.5 percent.

5. Reduce the temperature to 450°C. and raise the oxygen to 5 percent in the feed. Again increase temperature to 500°C. at a rate to maintain oxygen in the effluent gas at about 4.5 percent. Cool the reactor to 450°C. and introduce air while raising temperature to 500°C. at a rate to maintain oxygen in the effluent gas.

6. Resume reaction.

EXAMPLE I

In this EXAMPLE, a precipitated alumina gel having a low alkali metal content and the composition set out below, was tested in the reaction system and by the procedures given above. The gel was T1732 obtained from Girdler Corp. and had the following composition and characteristics:

| Component | Weight Percent |
|---|---|
| Alumina (Al$_2$O$_3$) | 90.0 |
| Silica (SiO$_2$) | 0.1 |
| Sodium (Na$_2$O) | 0.02 |
| Iron (Fe$_2$O$_3$) | 0.07 |
| Sulfur (SO$_3$) | 3.5 |
| Water | balance |
| Specific Area, m$^2$/gm | 293 |
| Packing Density, lb/ft$^3$ | 44 |

The catalyst was tested under the following conditions:

| | |
|---|---|
| Catalyst bed height, inches | 100 |
| Liquid Hourly Space Velocity (LHSV), hr$^{-1}$ | 0.0375 |
| NH$_3$/Phenol (molar ratio) | 20/1 |
| Pressure, p.s.i.a. | 240 |
| Temperature, °C. | 377 |
| Conversion, % | 98.8 |

The initial activity of the catalyst can be expressed as a relative rate constant (k). The rate constant described the activity of a given catalyst relative to the activity of a catalyst operating at 375°C., 20:1 ammonia/phenol, 240 p.s.i.a., and 0.058 LHSV, hr$^{-1}$ producing 94.4 percent conversion of phenol, using a first order reaction mechanism and an activation energy of 28 kcal/g-mol. For this catalyst, the initial relative (k) was 1.0.

EXAMPLE II

In this EXAMPLE, a precipitated alumina gel having a sodium content of 1.6 percent by weight, expressed as sodium oxide, was tested in the reaction system and by the procedures given above. The gel was H151 obtained from Aluminum Corp. of America and had the following composition and characteristics:

| Component | Weight Percent |
|---|---|
| Alumina (Al$_2$O$_3$) | 90.0 |
| Silica (SiO$_2$) | 2.2 |
| Sodium (Na$_2$O) | 1.6 |
| Iron (Fe$_2$O$_3$) | 0.13 |
| Water | balance |
| Average Pore Size (A°) | 50 |
| Porosity, cc/gm. | 0.30 |
| Specific Area, m$^2$/gm | 350–390 |
| Packing Density lb/ft$^3$ | 53 |

The catalyst was tested under the following conditions:

| | |
|---|---|
| Catalyst bed height, inches | 100 |
| Liquid Hourly Space Velocity (LHSV), hr$^{-1}$ | 0.0375 |
| NH$_3$/Phenol (molar ratio) | 20/1 |
| Pressure, p.s.i.a. | 240 |
| Temperature, °C. | 429 |
| Conversion, % | 94.5 |

The initial activity of the catalyst expressed as relative rate constant (k) was 0.15, reaction results were unsatisfactory and the reaction temperature was too high to make the catalyst commercially feasible.

A fresh quantity of the gel described above was then leached with boric acid by immersion in a two percent by weight solution thereof and the mixture was heated at 80°–90°C. for 120 minutes. The treated catalyst was then analyzed for sodium content by spark spectra analysis and found to contain 0.8 percent by weight sodium expressed as sodium oxide. The treated catalyst was then retested under the conditions given above. The intial activity expressed as relative rate constant (k) was 1.3 operating at 98.2 percent conversion and 363°C.

Another quantity of fresh catalyst was leached with hydrochloric acid by immersion in a 0.6 percent by weight solution thereof and the mixture was heated at 80°–90°C. for 120 minutes. The treated catalyst was then analyzed for sodium content by spark spectra analysis and found to contain 0.2 percent by weight of sodium expressed as sodium oxide. The treated catalyst was then retested under the conditions given above. The initial activity expressed as relative constant (k) was 1.6 operating at 98.9 percent conversion and 363°C.

COMPARATIVE EXAMPLE A

In this EXAMPLE, a silica alumina made from natural clays and containing only traces of sodium was tested in the reaction system and by the procedures given above. The silica-alumina was Houdry K-O obtained from the Houdry Corporation and had the following composition and characteristics:

| Component | Weight Percent |
|---|---|
| Alumina (Al$_2$O$_3$) | 45.0 |
| Titania (TiO$_2$) | 2–10 |
| Sodium (Na$_2$O) | 0.01 |
| Iron (Fe$_2$O$_3$) | 0.3 |
| Silica (SiO$_2$) | balance |
| Average Pore Size, (A°) | 125 |
| Porosity, cc/gm | 0.40 |
| Specific Area, m$^2$/gm | 132 |
| Packing Density, lb/ft$^3$ | 47–48 |

The catalyst was tested under the following conditions:

| | |
|---|---|
| Catalyst bed height, inches | 100 |
| Liquid Hourly Space Velocity (LHSV), hr$^{-1}$ | 0.0375 |
| NH$_3$/Phenol (molar ratio) | 20/1 |
| Pressure, p.s.i.a. | 240 |
| Temperature, °C. | 414 |
| Conversion, % | 94.5 |

A fresh quantity of the silica alumina described was then leached with boric acid by immersion in a two percent by weight solution thereof and the mixture was heated at 80°–90°C. for 120 minutes. The treated catalyst was then retested under the conditions given above. The initial activity expressed as relative rate constant ($k$) did not change and was 0.2.

COMPARATIVE EXAMPLE B

In this EXAMPLE, an alumina made from natural clays containing 0.30 percent by weight sodium, expressed as sodium oxide, was tested in the reaction system and by the procedures given above. The alumina was Girdler T1746 obtained from Girdler Corporation and had the following composition and characteristics:

| Component | Weight Percent |
|---|---|
| Alumina ($Al_2O_3$) | 93.6 |
| Silica ($SiO_2$) | 0.02 |
| Sodium ($Na_2O$) | 0.30 |
| Iron ($Fe_2O_3$) | 0.02 |
| Sulfur ($SO_3$) | 3.5 |
| Water | balance |
| Average Pore Size, (A°) | 140 |
| Porosity, cc/gm | 0.32 |
| Specific Area, $m^2$/gm | 390 |
| Packing Density, lb/$ft^3$ | 45–50 |

The catalyst was tested under the following conditions:

| | |
|---|---|
| Catalyst bed height, inches | 96 |
| Liquid Hourly Space Velocity (LHSV), $hr^{-1}$ | 0.0375 |
| $NH_3$/Phenol (molar ratio) | 20/1 |
| Pressure, p.s.i.a. | 240 |
| Temperature, °C. | 401 |
| Conversion, % | 93.9 |

The initial activity of the catalyst expressed as relative rate constant ($k$) was 0.2 to 0.3.

COMPARATIVE EXAMPLE C

In this EXAMPLE, an alumina made from natural clay containing 0.80 percent by weight sodium, expressed as sodium oxide, was tested in the reaction system and by the procedures given above. The alumina was ALCOA F-1 obtained from the Aluminum Corporation of America and had the following composition and characteristics:

| Component | Weight Percent |
|---|---|
| Alumina ($Al_2O_3$) | 92.0 |
| Silica ($SiO_2$) | 0.09 |
| Sodium ($Na_2O$) | 0.80 |
| Iron ($Fe_2O_3$) | 0.08 |
| Average Pore Size, (A°) | 40 |
| Porosity, cc/gm | 0.25 |
| Specific Area, $m^2$/gm | 210 |
| Packing Density, lb/$ft^3$ | 55 |

The catalyst was tested under the following conditions:

| | |
|---|---|
| Catalyst bed height, inches | 100 |
| Liquid Hourly Space Velocity (LHSV), $hr^{-1}$ | 0.0375 |
| $NH_3$/Phenol (molar ratio) | 20/1 |
| Pressure, p.s.i.a. | 240 |
| Temperature, °C. | 464 |
| Conversion, % | 94.6 |

The initial activity of the catalyst expressed as relative rate constant ($k$) was 0.05.

A fresh quantity of the alumina described was then leached with hydrochloric acid by immersion in a 0.6 percent by weight solution thereof and the mixture was heated at 80°–90°C. for 120 minutes. The treated catalyst was then analyzed for sodium content by spark spectra analysis and found to contain 0.2 percent by weight sodium expressed as sodium oxide. The treated catalyst was then retested under the conditions given above. The initial activity, expressed as relative rate constant ($k$) was 0.2, giving 94.0 percent conversion at 413°C.

COMPARATIVE EXAMPLE D

In this EXAMPLE, an alumina containing only traces of sodium was tested in the reaction system and by the procedures given above. The alumina was CATAPAL, obtained from the Continental Oil Co. The alumina is prepared by precipitation as a fine crystalline powder from solution in organic alcohol. It had the following composition and characteristics:

| Component | Weight Percent |
|---|---|
| Alumina ($Al_2O_3$) | 99.0 |
| Sodium ($Na_2O$) | 0.01 |
| Iron ($Fe_2O_3$) | 0.01 |
| Water | balance |
| Average Pore Size, (A°) | 100 |
| Specific Area, $m^2$/gm | 200 |
| Packing Density, lb/$ft^3$ | 37 |

The catalyst was tested under the following conditions:

| | |
|---|---|
| Catalyst bed height, inches | 100 |
| Liquid Hourly Space Velocity (LHSV), $hr^{-1}$ | 0.0375 |
| $NH_3$/Phenol (molar ratio) | 20/1 |
| Pressure, p.s.i.a. | 240 |
| Temperature, °C. | 410 |
| Conversion, % | 95.1 |

The initial activity of the catalyst expressed as relative rate constant ($k$) was 0.2.

A fresh quantity of the alumina described was then leached with hydrochloric acid by immersion in a 0.6 percent by weight solution thereof and the mixture was heated to 80°–90°C. for 120 minutes. The treated catalyst was then retested under the conditions given above. The initial activity expressed as relative rate constant ($k$) was 0.2, operating at 412°C. and 94.8 percent conversion.

EXAMPLE III

In this EXAMPLE, a precipitated alumina gel having a sodium content of 0.02 percent by weight, expressed as sodium oxide, was tested in the reaction system and by the procedures given above. The gel was T1732 obtained from Girdler Corporation and had the following composition and characteristics:

| Component | Weight Percent |
|---|---|
| Alumina ($Al_2O_3$) | 90.0 |
| Silica ($SiO_2$) | 0.1 |
| Sodium ($Na_2O$) | 0.02 |
| Iron ($Fe_2O_3$) | 0.07 |
| Sulfur ($SO_3$) | 3.5 |
| Water | balance |
| Porosity, cc/gm | 0.31 |
| Specific Area, $m^2$/gm | 293 |
| Packing Density, lb/$ft^3$ | 44 |

The catalyst was tested under the following conditions:

| | |
|---|---|
| Catalyst bed height, inches | 100 |
| Liquid Hourly Space Velocity (LHSV), hr$^{-1}$ | 0.06 |
| NH$_3$/Phenol (molar ratio) | 20/1 |
| Pressure, p.s.i.a. | 240 |

| Total Hours On Stream | Cycle Hours | Temp. °C. | Phenol Conversion,(%) | Average Selectivity of Cycle (%) |
|---|---|---|---|---|
| 10 | 10 | 385 | 97.9 | — |
| 250 | 250 | 385 | 96.5 | — |
| 500 | 500 | 385 | 94.2 | — |
| 605 | 605 | 385 | 93.0 | 99 |
| 1st regeneration | | | | |
| 615 | 10 | 385 | 98.0 | — |
| 855 | 250 | 385 | 96.6 | — |
| 1105 | 500 | 385 | 94.0 | — |
| 1205 | 600 | 385 | 93.1 | 99 |
| 2nd regeneration | | | | |
| 1215 | 10 | 385 | 98.0 | 99 |

EXAMPLE IV

In this EXAMPLE, a precipitated alumina gel having a sodium content of 1.6 percent by weight, expressed as sodium oxide, was leached with boric acid and then tested in the reaction system and by the procedures given above.

The gel was H151 obtained from Aluminum Corporation of America and had the following composition and characteristics.

| Component | Weight Percent |
|---|---|
| Alumina (Al$_2$O$_3$) | 90.0 |
| Silica (SiO$_2$) | 2.2 |
| Sodium (Na$_2$O) | 1.6 |
| Iron (Fe$_2$O$_3$) | 0.13 |
| Water | balance |
| Average Pore Size (A°) | 50 |
| Porosity, cc/gm. | 0.30 |
| Specific Area, m$^2$/gm | 350–390 |
| Packing Density, lb/ft$^3$ | 53 |

The gel was leached by immersion in a boiling, 2 percent by weight aqueous solution of boric acid, at 80°–90°C. for 120 minutes. The sodium content after leaching was 0.8 percent by weight, expressed as sodium oxide.

The catalyst was tested under the following conditions:

| | |
|---|---|
| Catalyst bed height, inches | 100 |
| Liquid Hourly Space Velocity (LHSV), hr$^{-1}$ | 0.06 |
| NH$_3$/Phenol (molar ratio) | 20/1 |
| Pressure, p.s.i.a. | 240 |

| Total Hours On Stream | Cycle Hours | Temp. °C. | Phenol Conversion(%) | Average Selectivity of Cycle (%) |
|---|---|---|---|---|
| 10 | 10 | 368 | 94.4 | — |
| 250 | 250 | 372 | 94.0 | — |
| 500 | 500 | 377 | 94.4 | — |
| 605 | 605 | 380 | 95.0 | 99 |
| 1st regeneration | | | | |
| 615 | 10 | 368 | 94.6 | — |
| 855 | 250 | 373 | 94.4 | — |
| 1150 | 500 | 378 | 95.0 | — |
| 1205 | 600 | 379 | 94.5 | 99 |
| 2nd regeneration | | | | |
| 1215 | | 94.4 | 368 | 99 |

EXAMPLE V

EXAMPLE IV is repeated except that the LHSV is reduced from 0.06 to 0.025 hrs$^{-1}$. The following results were obtained:

| Total Hours On Stream | Cycle Hours | Temp. °C. | Phenol Conversion(%) | Average Selectivity of Cycle (%) |
|---|---|---|---|---|
| 10 | 10 | 365 | 99.9 | 99 |
| 500 | 500 | 365 | 99.7 | 99 |
| 800 | 800 | 365 | 99.5 | 99 |
| 1440 | 1440 | 365 | 98.8 | 99 |
| 1st regeneration | | | | |
| 1450 | 10 | 365 | 99.9 | 99 |

COMPARATIVE EXAMPLE E

In this EXAMPLE, a precipitated silica-alumina gel known as Durabead having a sodium content of 0.11 percent by weight, expressed as sodium oxide, was tested in the reaction system and by the procedures given above. The gel was Durabead-1 and was obtained from Moble Oil Co. It had the following composition and characteristics:

| Component | Weight Percent |
|---|---|
| Alumina (Al$_2$O$_3$) | 9.9 |
| Sodium (Na$_2$O) | 0.11 |
| Iron (Fe$_2$O$_3$) | nil |
| Silica (SiO$_2$) | balance |
| Specific Area, m$^2$/gm | 425 |
| Packing Density, lb/ft$^3$ | 50 |

The catalyst was tested under the following conditions:

| | |
|---|---|
| Catalyst bed height, inches | 100 |
| Liquid Hourly Space Velocity (LHSV), hr$^{-1}$ | 0.06 |
| NH$_3$/Phenol (molar ratio) | 20/1 |
| Pressure, p.s.i.a. | 240 |

| Total Hours On Stream | Cycle Hours | Temp. °C. | Phenol Conversion(%) | Average Selectivity of Cycle (%) |
|---|---|---|---|---|
| 31 | 31 | 380 | 94.9 | — |
| 123 | 123 | 390 | 94.3 | — |
| 180 | 180 | 400 | 94.5 | 96 |
| 1st regeneration | | | | |
| 184 | 4 | 400 | 94.9 | — |
| 309 | 129 | 408 | 94.8 | 96 |
| 2nd regeneration | | | | |
| 340 | 31 | 400 | 94.6 | — |
| 386 | 77 | 410 | 94.6 | — |
| 438 | 129 | 421 | 95.6 | 96 |
| 3rd regeneration | | | | |
| 462 | 24 | 405 | 87.2 | — |
| 478 | 40 | 421 | 93.6 | — |
| 490 | 52 | 425 | 94.5 | — |
| 558 | 100 | 435 | 95.1 | — |
| 568 | 130 | 445 | 94.5 | 96 |

It is apparent that the catalyst has not successfully regenerated but continues to lose activity.

COMPARATIVE EXAMPLE F

In this EXAMPLE, a silica-alumina made from a natural clay having only traces of sodium was tested in the reaction system and by the procedures given above. The gel was Houdry K-O obtained from the Houdry Corporation and had the following composition and characteristics:

| Component | Weight Percent |
|---|---|
| Alumina ($Al_2O_3$) | 45.0 |
| Titania ($TiO_2$) | 2–10 |
| Sodium ($Na_2O$) | 0.01 |
| Iron ($Fe_2O_3$) | 0.3 |
| Silica ($SiO_2$) | balance |
| Average Pore Size (A°) | 125 |
| Porosity, cc/gm | 0.40 |
| Specific Area, m²/gm | 132 |
| Packing Density, lb/ft³ | 47 |

The catalyst was tested under the following conditions:

| | |
|---|---|
| Catalyst bed height, inches | 100 |
| Liquid Hourly Space Velocity (LHSV), hr⁻¹ | 0.06 |
| $NH_3$/Phenol (molar ratio) | 20/1 |
| Pressure, p.s.i.a. | 240 |

| Total Hours On Stream | Cycle Hours | Temp. °C. | Phenol Conversion (%) | Average Selectivity of Cycle (%) |
|---|---|---|---|---|
| 42 | 42 | 420 | 96.8 | — |
| 130 | 130 | 438 | 95.2 | — |
| 248 | 248 | 458 | 94.9 | 96 |
| 1st regeneration | | | | |
| 266 | 18 | 420 | 95.1 | — |
| 360 | 112 | 441 | 95.1 | — |
| 442 | 194 | 454 | 94.5 | — |
| 459 | 211 | 458 | 95.1 | 96 |
| 2nd regeneration | | | | |
| 479 | 20 | 420 | 95.8 | — |
| 569 | 110 | 459 | 94.9 | — |
| 754 | 185 | 451 | 94.1 | — |
| 793 | 224 | 457 | 94.8 | 96 |
| 3rd regeneration | | | | |
| 815 | 22 | 420 | 94.9 | 96 |

EXAMPLE VI

The procedures of Examples III and IV were repeated using equivalent amounts (based upon the hydroxy function) of the following alcohols: alpha-naphthol, β-naphthol, 4,4' dihydroxydiphenyl, bis (4,4' hydroxyphenyl) propane, bis (4,4' hydroxyphenyl) methane-o-cresol, 1-methyl-2-naphthol, 1,8 naphthalenediol, o-butylphenol, 2,6-dimethoxyphenol, 2-methoxy-4-methylphenol, m-hydroxybiphenyl, catechol, and pyrogallol. Excellent results were obtained in each case and the catalysts were regenerable.

EXAMPLE VII

This EXAMPLE describes the preparation of 2,2-bis(p-aminophenyl) propane (I) via the liquid phase amination of 4,4-isopropylidene bisphenol, i.e., bisphenol A(II). 800 g. of II and 80 g. of alumina gel, T1732 made by Girdler Corp. in powder form, were charged to a 2-liter stainless steel autoclave. The system was pressured to 400 p.s.i.g. with nitrogen and the pot heated to 300°C.

Ammonia was then fed into the pot via a gas sparging tube at the rate of 100 liters (gas) per hour. Liquid ammonia from a cylinder pressured to 1,000 p.s.i.g. was passed through a rotameter and a heated line at 200°C. into the gas sparging tube in the autoclave. The effluent gas, comprising ammonia and water, was passed through an overhead take-off condenser and collected in a 2-liter bomb. The system pressure was maintained at 400 p.s.i.g. with nitrogen. After eight hours, the ammonia feed was stopped and nitrogen was passed through the feed system in order to remove any residual ammonia. The pot was cooled to 175°C. and discharged. After filtering off the catalyst, the effluent analyzed for 80 percent I via vapor phase chromatograph. The retention time of I in the pot effluent was the same, on two vapor phase chromatograph columns, as that of I prepared via a known synthetic technique from aniline hydrochloride and acetone.

The results obtained in EXAMPLES I and II and COMPARATIVE EXAMPLES A through D are summarized below in Table I. The results indicate that high catalyst activity is achieved only with precipitated alumina gel which has an alkali metal content, expressed as alkali metal oxide, of less than 1.0 weight percent.

TABLE I

| EXAMPLES | Description of Alumina | Weight % $Na_2O$ | (k) Relative Rate Constant |
|---|---|---|---|
| I | gel | 0.02 | 1.0 |
| II | | | |
| (a) Before leaching | gel | 1.6 | 0.15 |
| (b) After leaching with boric acid | gel | 0.8 | 1.3 |
| (c) After leaching with hydrochloric acid | gel | 0.2 | 1.6 |
| Comparative A | clay derived | 0.01 | 0.28–0.30 |
| Comparative B | clay derived | 0.30 | 0.2–0.3 |
| Comparative C | clay derived | | |
| (a) Before leaching | | 0.80 | 0.05 |
| (b) After leaching | | 0.20 | 0.2 |
| Comparative D | crystalline precipitate | | |
| (a) Before leaching | | 0.01 | 0.2 |
| (b) After leaching | | — | 0.2 |

In Table II below, the initial temperature, conversion, selectivity and regeneration data clearly demonstrate that the performance of the catalysts described herein, which consist essentially of alumina, is superior to the performance of catalysts which contain less alumina.

The extent to which a catalyst is regenerated is measured by the temperature necessary to restart the reaction after each regeneration at the same level of conversion. If the temperature after regeneration is higher than initial reaction temperature, regeneration has been less than complete, the catalyst will eventually lose activity, and the problems inherent in high temperature operation must be confronted. The catalyst compositions of this invention in Examples III, IV and V had long cycle times and returned to their original activity after each regeneration. The catalyst of COM- PARATIVE EXAMPLE F also returned to its initial activity but had short cycle times and required high temperatures to maintain conversion. The high temperatures result in a lowered selectivity, ammonia dissociation and increased plant costs due to more expensive materials of construction. The catalyst is, therefore, unsuitable for commercial use.

TABLE II

|  | EXAMPLE III | EXAMPLE IV | EXAMPLE V | COMP. EXAM. E | COMP. EXAM. F |
|---|---|---|---|---|---|
| Type of Alumina | Gel | Gel | Gel | Gel | Bauxite (treated) |
| Wt.%, $Al_2O_3$ | 90 | 90 | 90 | 10 | 45 |
| Initial Phenol Conversion (%) | 98 | 94 | 99+ | 95 | 95 |
| Aniline Selectivity (%) | 99 | 99 | 99 | 96 | 96 |
| Initial Temperature, °C. | 385 | 368 | 365 | 380 | 420 |
| Temperature After 1st regeneration, °C. | 385 | 368 | 365 | 400 | 420 |
| Temperature After 2nd regeneration, °C. | 385 | 368 | — | 400 | 420 |
| Temperature After 3rd regeneration, °C. | — | — | — | 420 | 420 |
| Average Cycle Time, hrs. | 600 | 602 | 1440 | 130 | 228 |
| Productivity, LHSV, $hr^{-1}$ | .06 | 0.06 | 0.025 | 0.06 | 0.06 |

We claim:

1. A process for preparing an organic amine from an organic alcohol selected from the group consisting of a compound of the formula

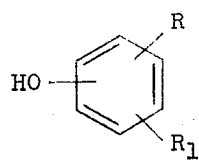 or 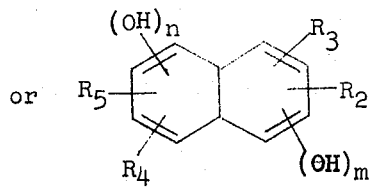

wherein $n$ and $m$ are numbers from zero to 2, only one of said $n$ and $m$ being zero at any one time, R and $R_1$-$R_5$ are hydrogen, hydroxy, lower alkyl, lower alkoxy, phenyl, phenyl lower alkyl, substituted phenyl lower alkyl of the formula

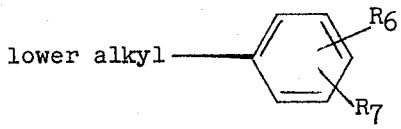

wherein $R_6$ and $R_7$ are hydrogen, hydroxy, lower alkoxy, only one of said $R_6$ and $R_7$ being hydrogen at any one time, and substituted phenyl containing substituents $R_6$ and $R_7$ as above, comprising the steps of: reacting ammonia and said alcohol in the presence of a catalyst consisting essentially of alumina derived from a precipitated gel form, having a surface area of at least 150 sq. meters per gram and having an alkali metal content, expressed as alkali metal oxide, of not more than 1.0 percent by weight.

2. A process for the production of aniline from phenol and ammonia, according to claim 1, wherein ammonia and phenol are reacted in the vapor phase in the presence of an alumina catalyst derived from a precipitated gel, said dried gel having been leached with an acid, an acid salt or water to reduce the alkali metal content thereof to less than 1.0 percent by weight, expressed as alkali metal oxide.

3. A process according to claim 2 wherein said catalyst is leached with aqueous boric acid.

4. A process according to claim 2 wherein said catalyst is leached with aqueous hydrochloric acid.

5. A process according to claim 1 wherein the alcohol is 4-hydroxy phenyl methane.

6. A process according to claim 1 wherein the alcohol is 2,2 bis (4, hydroxyphenyl) propane.

7. A process according to claim 1 wherein the catalyst is leached with an acid, an acid salt or water to reduce the alkali metal content thereof to less than 1.0 percent by weight expressed as alkali metal oxide.

8. A process in accordance with claim 7 wherein said catalyst is leached with aqueous boric acid.

9. A process in accordance with claim 7 wherein said catalyst is leached with aqueous hydrochloric acid.

* * * * *

UNITED STATES PATENT OFFICE
CERTIFICATE OF CORRECTION

PATENT NO. : 3,860,650
DATED : January 14, 1975
INVENTOR(S) : Mitchell Becker, Sargis Khoobiar It is certified that error appears in the above-identified patent and that said Letters Patent are hereby corrected as shown below:

The last line in the table at the top of column 12 should read:

| 1215 | 10 | 368 | 94.4 | 99 |

Signed and Sealed this sixteenth Day of December 1975

[SEAL]

Attest:

RUTH C. MASON
Attesting Officer

C. MARSHALL DANN
Commissioner of Patents and Trademarks